United States Patent
Koo et al.

(10) Patent No.: US 7,907,523 B2
(45) Date of Patent: Mar. 15, 2011

(54) METHOD AND APPARATUS FOR CONTROLLING VARIABLE BIT-RATE VOICE CODEC

(75) Inventors: Ki-Jong Koo, Daejeon (KR); Dae-Ho Kim, Daejeon (KR); Tae-Gyu Kang, Daejeon (KR); Do Young Kim, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 449 days.

(21) Appl. No.: 11/930,678

(22) Filed: Oct. 31, 2007

(65) Prior Publication Data

US 2008/0130511 A1 Jun. 5, 2008

(30) Foreign Application Priority Data

Dec. 5, 2006 (KR) .................. 10-2006-0122571
Jul. 4, 2007 (KR) .................. 10-2007-0067030

(51) Int. Cl.
*H04L 12/26* (2006.01)
(52) U.S. Cl. ..................................... 370/230
(58) Field of Classification Search .......... 370/229–236, 370/464, 465; 709/227–233
See application file for complete search history.

(56) References Cited

U.S. PATENT DOCUMENTS

| | | | | |
|---|---|---|---|---|
| 5,570,355 A * | 10/1996 | Dail et al. | ...................... | 370/352 |
| 6,529,499 B1 * | 3/2003 | Doshi et al. | .................... | 370/352 |
| 7,002,992 B1 * | 2/2006 | Shaffer et al. | ................. | 370/468 |
| 7,023,839 B1 * | 4/2006 | Shaffer et al. | ................. | 370/356 |
| 7,072,336 B2 * | 7/2006 | Barany et al. | ................. | 370/389 |
| 7,254,120 B2 * | 8/2007 | LeBlanc | ........................ | 370/335 |
| 7,295,549 B2 * | 11/2007 | Pepin et al. | .................... | 370/352 |
| 7,668,712 B2 * | 2/2010 | Wang et al. | .................... | 704/219 |
| 2004/0160979 A1 * | 8/2004 | Pepin et al. | .................... | 370/462 |
| 2007/0025301 A1 * | 2/2007 | Petersson et al. | ............. | 370/338 |

FOREIGN PATENT DOCUMENTS

| | | |
|---|---|---|
| JP | 2001-148713 | 5/2001 |
| KR | 10-2004-0036200 | 4/2004 |
| KR | 102005004620 | 5/2005 |

OTHER PUBLICATIONS

"Voice-Quality Monitoring and Control for VoIP", Michael Manousos et al., IEEE Internet Computering, Jul. Aug. 2005.

* cited by examiner

*Primary Examiner* — Dmitry H Levitan
(74) *Attorney, Agent, or Firm* — Rabin & Berdo, PC

(57) ABSTRACT

A method and apparatus for controlling a variable bit-rate voice codec are provided. The method of controlling the variable bit-rate voice codec may include: extracting calling capability of terminals that request a new call to be made; extracting network parameters from existing calls in the network through an exchanged packet; measuring voice quality of the existing calls based on the extracted network parameters; and determining whether to permit a new call to be made based on the measured voice quality and the calling capability. Accordingly, it is possible to secure QoS of a voice service between terminals by adjusting a transmission rate of the variable bit-rate codec based on transmission capability of a network.

24 Claims, 4 Drawing Sheets

METHOD AND APPARATUS FOR CONTROLLING VARIABLE BIT-RATE VOICE CODEC

CROSS-REFERENCE TO RELATED PATENT APPLICATION

This application claims the benefit of Korean Patent Application No. 10-2006-0122571, filed on Dec. 5, 2006 and Korean Patent Application No. 10-2007-0067030, filed on Jul. 4, 2007 in the Korean Intellectual Property Office, the disclosures of which are incorporated herein in their entirety by reference.

BACKGROUND OF THE INVENTION

1. Field of the Invention

The present invention relates to a method of controlling a variable bit-rate codec, and more particularly, to a method of controlling a variable bit-rate codec capable of securing QoS of a voice service between terminals by controlling a transmission rate of the variable bit-rate codec based on transmission capability of a network, when a real time multimedia service is provided through a linkage between a packet network and an existing wired and wireless network and when using a variable bit-rate codec that provides different transmission rates to transmitting and receiving ends.

The present invention was supported by the Information Technology (IT) Research & Development (R&D) program of the Ministry of Information and Communication (MIC) [project management number: 2005-S-100-02, subject title: Development of Multi-codec and Its Control Technology Providing Variable Bandwidth Scalability].

2. Description of the Related Art

A variable bit-rate codec is a technique of converting a natural sound into digitally transformed codec data with a plurality of transmission rates. For example, a frequency band can be classified into a narrow-band (a band ranging form 300 Hz to 3400 Hz), a wide-band (a band ranging from 50 Hz to 7000 Hz), or an audio-band (a band ranging from 20 Hz to 20000 Hz). In each band, transmission rates of 8, 12, 14, 16, 18, 20, 22, 24, 26, 28, 30, and 32 kbps can be obtained.

For example, a bandwidth provided by a network of a voice over internet protocol (VoIP) voice telephone service in a packet network is variable and unpredictable. In addition, in variable bit-rate codec with a transmission rate of 32 kbps, high-quality sounds are produced. In variable bit-rate codec with a transmission rate of 8 kbps, low-quality sounds are produced. In this case, when there is a spare band in the network and when it is possible to transmit a signal within a high frequency band, a signal with a transmission rate of 32 kbps can be transmitted. When the network band is changed and a network situation deteriorates, a signal with a low transmission rate such as 30 kbps, 28 kbps, or the like can be transmitted. Although the sound quality of signals with lower transmission rates is deteriorated, it is possible to achieve good transmission in the network.

In a variable bit-rate codec, when a transmission rate is high, sounds have high quality, but the probability of loss and delays in transmission through the network is high. On the contrary, when the transmission rate is low, sounds have low quality, but the probability of loss and delays in transmission through the network is low.

On the other hand, in order to apply a variable bit-rate codec, a signal protocol conversion technique for making a call is applied. A signal protocol conversion technique is disclosed in RFC 3261 SIP of IETF, RFC 3264 Offer/Answer SDP, RFC 2833 RTP Payload for DTMP Digits, Telephony Tones and Telephony Signals, RFC 2327 SDP, RFC 3108 ATM SDP, RFC 1890 RTP Profile Payload type, and the like.

An apparatus for calling by selecting a codec determined by network parameters among a plurality of codecs installed in a terminal is disclosed in U.S. Pat. No. 7,002,992 B1 ("Codec Selection to improve media communication").

An adaptive multirate (AMR) codec control method of controlling a bit-rate of a voice codec based on strength of a wireless signal is disclosed in U.S. Pat. No. 2003/0189900A1 ("Communications using adaptive multi-rate codecs").

However, the aforementioned conventional technique does not control the bit-rate of the codec based on voice quality.

SUMMARY OF THE INVENTION

The present invention provides a method and apparatus for measuring voice quality by using a single codec that supports a variable bit-rate and by using network parameters extracted from a packet that is exchanged between terminals connected to a network and controlling a bit-rate of a terminal codec by using the measured voice quality.

Other objects and advantages of the present invention will be understood in the following description, and more clearly understood in embodiments of the present invention. In addition, it is easily understood that the objects and advantages of the present invention can be embodied by means and their combination defined by the appended claims.

The present invention can secure QoS of a terminal service by using a single codec that supports a variable bit-rate and alleviate a load of a codec to be installed in a terminal.

The present invention can also secure QoS of a voice service between terminals by adjusting a transmission rate of a variable bit-rate codec based on transmission capability of a network by measuring voice quality by using network parameters by allowing a separate QoS manager such as a voice codec control apparatus to be included in a network and by controlling the bit-rate of the terminal codec by using the measured voice quality.

According to an aspect of the present invention, there is provided a variable bit-rate voice codec control apparatus for controlling codec bit rates of terminals connected to a network with a variable bit-rate voice codec, the variable bit rate voice codec control apparatus including a terminal information extraction unit extracting calling capability of the terminals which request a new call to be made; a call quality monitor extracting network parameters from existing calls in the network through an exchanged packet and measuring voice quality of the existing calls based on the extracted network parameters; and an admission policy unit determining whether to permit the new call to be made based on the measured voice quality and the extracted calling capability.

According to another aspect of the present invention, there is provided a variable bit-rate voice codec control apparatus for controlling a codec bit-rate of terminals connected to a network with a variable bit-rate voice codec, the variable bit-rate voice codec control apparatus including a call quality monitor extracting network parameters from each of a plurality of existing calls between terminals in the network and measuring voice quality of each existing call based on the extracted network parameters; and an admission policy unit determining whether to change the codec bit-rate of respective terminals to which calls are connected based on an increase and a decrease in the measured voice quality.

According to another aspect of the present invention, there is provided a terminal connected to a network, including a voice codec supporting a variable bit-rate; and a controller controlling a bit-rate of the voice codec by transmitting a request for making a call to another terminal that is connected to the network and a maximum transmission bit-rate of the voice codec to a voice codec control apparatus and receiving permission for the call to be made and permitted bit-rate not greater than the maximum transmission bit-rate from the voice codec control apparatus based on information on voice quality of other calls previously made in the network.

According to another aspect of the present invention, there is provided a terminal connected to a network, including a voice codec supporting a variable bit-rate; and a controller receiving a changed codec bit-rate not greater than a maximum transmission bit-rate of the voice codec from a voice codec control apparatus for controlling a codec bit-rate of the voice codec based on a change in voice quality of existing calls in the network and changing a bit-rate of the voice codec based on the received changed codec bit-rate.

According to another aspect of the present invention, there is provided a method of controlling a variable bit-rate voice codec of terminals which are connected to a network, the method including (a) extracting calling capability of terminals that request a new call to be made; (b) extracting network parameters from existing calls in the network through an exchanged packet; (c) measuring voice quality of the existing calls based on the extracted network parameters; and (d) determining whether to permit the new call to be made based on the measured voice quality and the extracted calling capability.

According to another aspect of the present invention, there is provided a method of controlling a variable bit-rate voice codec of terminals connected a network, the method including (a) extracting network parameters from each of a plurality of existing calls between terminals in the network; (b) measuring voice quality of each existing call based on the extracted network parameters; and (c) determining whether to change the codec bit-rate of the respective terminals to which the calls are connected based on an increase and a decrease in the measured voice quality.

According to another aspect of the present invention, there is provided a method of controlling making a call of a terminal that is connected to a network, with a voice codec for supporting a variable bit-rate, the method including (a) requesting a voice codec control apparatus to make a call with another terminal in the network; (b) transmitting a maximum transmission bit-rate of the voice codec to the voice codec control apparatus; (c) receiving permission for the call to be made and a permitted bit-rate not greater than the maximum transmission bit-rate based on information on voice quality of other calls previously made in the network; and (d) controlling a bit-rate of the voice codec based on the permitted bit-rate.

According to another aspect of the present invention, there is provided a method of changing a codec bit-rate of a terminal including a variable bit-rate voice codec which is connected to a network and to which a call is currently being made, the method including receiving a changed codec bit-rate that is determined based on a change in voice quality of the current call from the voice codec control apparatus for controlling the codec bit-rate of the terminal; and changing a bit-rate of the voice codec based on the received changed codec bit-rate.

According to another aspect of the present invention, there is provided a computer-readable recording medium having embodied thereon a computer program for executing a method of controlling a variable bit-rate voice codec, a method of controlling making a call, and a method of changing a codec bit-rate of a terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
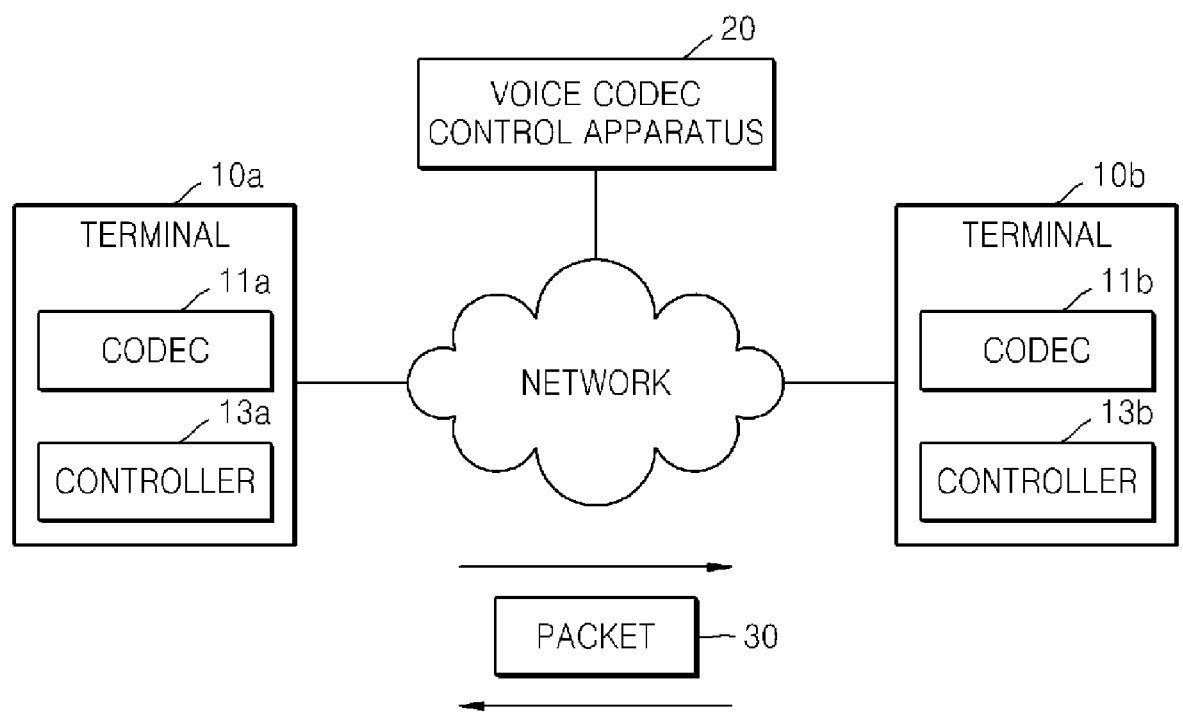
FIG. 1 is a schematic block diagram illustrating a communication system to which a technique of controlling a variable bit-rate voice codec is applied, according to an exemplary embodiment of the present invention.

Hereinafter, preferred embodiments of the present invention will be described in detail with reference to the attached drawings. Like reference numerals in the drawings denote like elements. When it is determined that detailed descriptions of known techniques or structures related to the present invention depart from the scope of the invention, the detailed descriptions will be omitted.

FIG. 1 is a schematic block diagram illustrating a communication system to which a technique of controlling a variable bit-rate voice codec is applied, according to an exemplary embodiment of the present invention is applied.

Referring to FIG. 1, the communication system to which the technique of controlling the variable bit-rate voice codec is applied according to the current embodiment of the present invention includes terminals 10a and 10b, a voice codec control apparatus 20, and a network which connects the terminals 10a and 10b and the voice codec control apparatus 20 with one another. Although only two terminals 10a and 10b are illustrated in FIG. 1 as being connected through a call, it is understood that a plurality of terminals connected through a network constitute one or more calls.

Making a call between the terminals 10a and 10b connected through the network and setting a codec bit-rate of the terminals 10a and 10b after making the call are controlled by the voice codec control apparatus 20. For example, the terminals 10a and 10b may request an existing H.323 gate keeper or session initiation protocol (SIP) server to make a call and to accept the call. The voice codec control apparatus 20 may be installed in the H.323 gate keeper or SIP server. Communication between the terminals 10a and 10b and communication between the terminals 10a and 10b and the voice codec control apparatus 20 may be performed by an exchange packet 30. The exchange packet 30 may be a real-time transfer protocol (RTCP) packet.

The terminals 10a and 10b may respectively include voice codecs 11a and 11b, which support a variable bit-rate, and variable bit-rate codec (VBRC) controllers (hereinafter, referred to as 'codec controller') 13a and 13b.

The voice codecs 11a and 11b are variable bit-rate codecs. For example, ITU-T G.729.1 may be used as the variable bit-rate codec.

The codec controllers 13a and 13b request the voice codec control apparatus 20 to make a call, receive information on a permissible bit-rate of the terminals 10a and 10b from the voice codec control apparatus 20, and control the voice codecs 11a and 11b of the terminals 10a and 10b.

That is, the terminals 10a and 10b extract a permissible bit-rate of a terminal codec by decoding an RTCP packet received from the voice codec control apparatus 20 and control the codec bit-rate of the terminals 10a and 10b.

Figure 2:
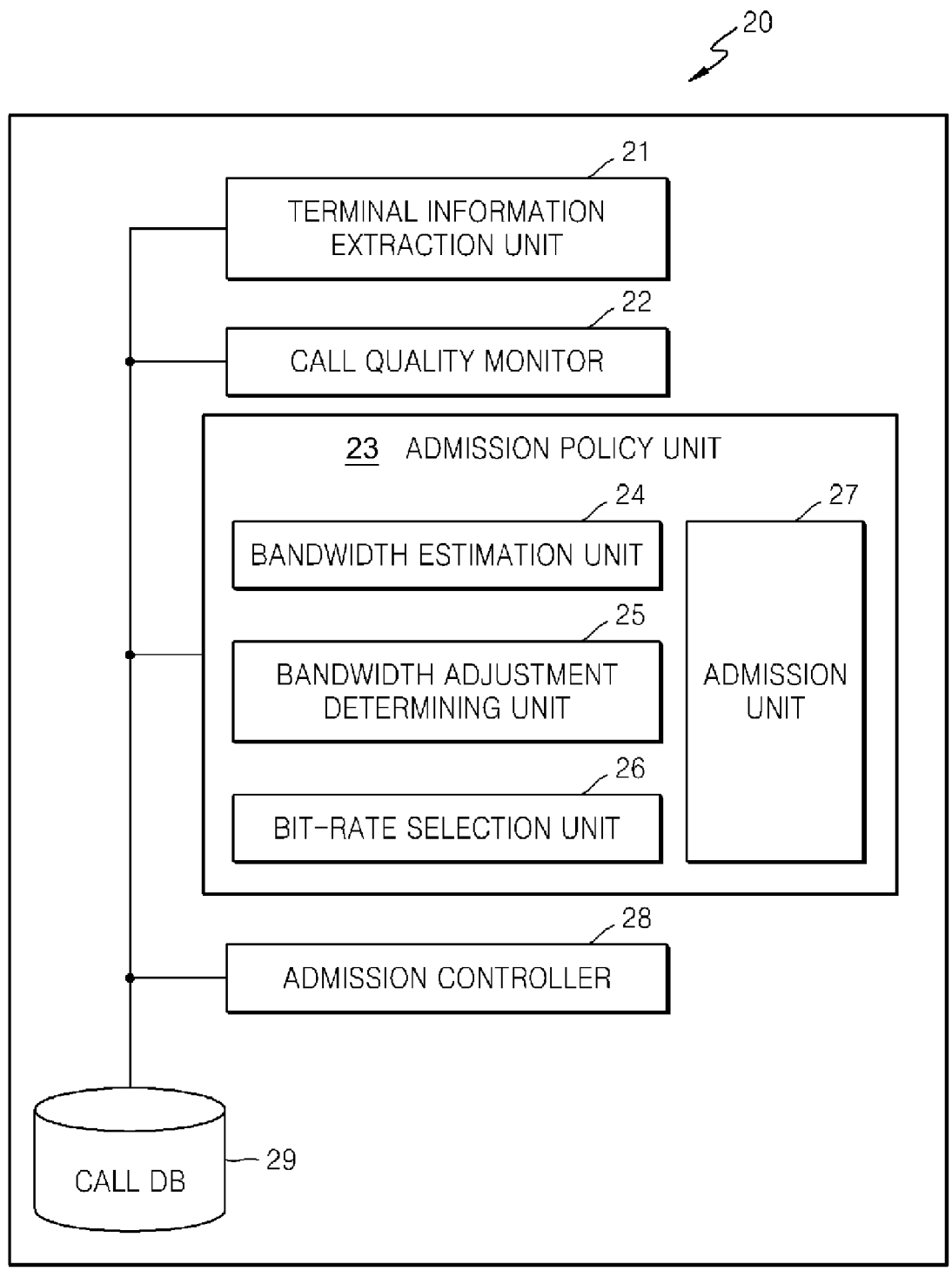
FIG. 2 is a block diagram illustrating an internal structure of a variable bit-rate voice codec, according to an exemplary embodiment of the present invention.

FIG. 2 is a block diagram illustrating an internal structure of the voice codec control apparatus 20 of the communication system illustrated in FIG. 1, according to an exemplary embodiment of the present invention.

Referring to FIG. 2, the voice codec control apparatus 20 according to the current embodiment of the present invention includes a terminal information extraction unit 21, a call quality monitor 22, an admission policy (AMP) unit 23, an admission controller (AMC) 28, and a call database 29.

The voice codec control apparatus 20 that is connected to the network measures voice quality of a call that is made between terminals by using network parameters and secures QoS of a voice service by controlling a codec bit-rate of the terminals based on the measured voice quality.

The terminal information extraction unit 21 extracts a codec type, a maximum transmission bit-rate of corresponding terminals, and the like through a communication packet from the terminals, when the terminals connected to the network request the voice codec control apparatus 20 to make a call. For example, when using an SIP, the terminal information extraction unit 21 may extract terminal information including a codec type (G729.1), an absolute maximum codec bit-rate per session (maxbitrate; If a maxbitrate is determined when a session is set, the determined maxbitrate is not changed until the session is over.), a maximum codec bit-rate (mbs) that is supported by a receiver (changeable during a session), and the like.

A call quality monitor (CQM) 22 measures voice quality of existing calls in the network by using network parameters. The CQM 22 measures voice quality by gathering network parameters for each call by using the RTCP packet. At this time, the extracted parameters are transmitted through the RTCP packet. The extracted parameters include a packet loss, a delay, jitter, and the like. The voice quality is measured by using an R-value in ITU-T G.107 (E-model) standard.

The E-model was standardized by European Telecommunications Standards Institute (ETSI) Speech processing, Transmission and Quality (STQ) in 1993 and standardized by International Telecommunication Union-Telecommunication Standardization Sector (ITU-T) as G.107. In the E-model, QoS is evaluated by using a relation among parameters by classifying various independent factors related to total transmission according to parameters in consideration of a loss and a delay which are unique to a data network. As a result of the E-model, a single value that is referred to as the R-value for representing total voice transmission quality is calculated. Since detailed contents of the E-model and the R-value are known, a detailed description thereof will not be provided.

The admission policy unit (AMP) 23 determines whether to change a codec bit-rate of a terminal to which each call is connected based on measured voice quality. When a change in the voice quality measured by the CQM 22 occurs, it is possible to determine whether to change the codec bit-rate of the terminal by using terminal information of each call included in the call database 29 and available bandwidth information. In addition, when the admission controller 28 requests a call to be made, it is determined whether to permit the call by using the maximum transmission bit-rate of the terminal which requests the call to be made and the available bandwidth information.

Referring to FIG. 2, the AMP unit 23 includes a bandwidth estimation unit 24, a bandwidth adjustment determining unit 25, a bit-rate selection unit 26, and an admission unit 27.

The bandwidth estimation unit 24 estimates an available bandwidth of the network based on voice quality. When the available bandwidth satisfies a condition for making a new call, the admission unit 27 permits the new call to be made.

The bandwidth adjustment determining unit 25 determines whether a bandwidth needed to make a new call can be provided by adjusting bandwidths of the existing calls, when the available bandwidth does not satisfy the condition for making the new call.

The bit-rate selection unit 26 selects a changed codec bit-rate lower than those of the existing calls, when it is possible to provide a bandwidth needed for making a new call. In addition, when the voice quality of each call in the network is changed after the call is made and when the codec bit-rate is changed, the bit-rate selection unit 26 selects a codec bit-rate lower or higher than the existing bit-rate.

When it is possible to extract a bandwidth needed for making a new call from the existing calls, the admission unit 27 permits the new call to be made.

The admission controller (AMC) 28 controls the making of the call and a bit-rate available for the codec of the terminal based on the determination of the AMP. The AMC 28 requests the AMP unit 23 to determine whether to permit the call and manages the call based on the determination of the AMP unit 23. In addition, when desiring to change the codec bit-rate of the terminal, the AMC 28 controls a transmission bit-rate available for the codec of the terminal by transmitting the changed codec bit-rate to the corresponding terminal by using a separate RTCP packet.

The call database (call DB) 29 stores information on each call that is made in the network. The information on each call includes the maximum transmission bit-rate of each terminal to which the call is connected. In addition, the information on the call includes bandwidth information of the available network.

Figure 3:
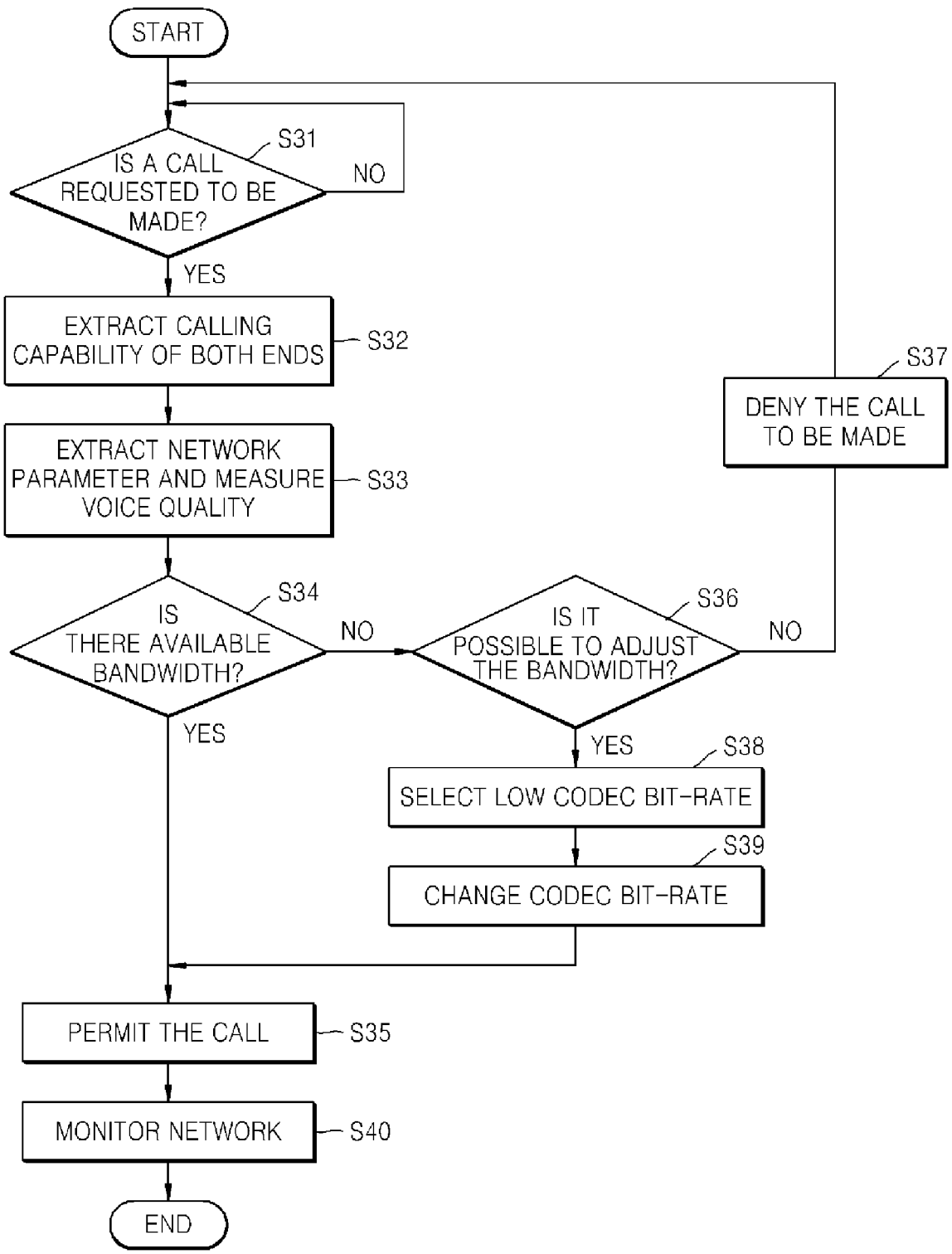
FIG. 3 is a flowchart illustrating a process of controlling the making of a call between terminals with a variable bit-rate voice codec, according to an exemplary embodiment of the present invention.

FIG. 3 is a flowchart illustrating a process of controlling the making of a call between terminals with a variable bit-rate voice codec, according to an exemplary embodiment of the present invention.

Referring to FIG. 3, when receiving a request for making a call from a terminal connected to a network (operation S31), a voice codec control apparatus extracts calling capability of the terminal (operation S32). Here, the calling capability is the maximum transmission bit-rate that can be transmitted by the codec of the terminal. The voice codec control apparatus calculates a bandwidth needed for making the call by using the maximum transmission bit-rate.

The voice codec control apparatus extracts a network parameter for each existing call between currently communicating terminals in the network and measures voice call quality based on the network parameter (operation S33). The extracted network parameter is transmitted between the terminals through an RTCP packet. The network parameter includes at least one of a packet loss, a delay, jitter, and the like.

Next, the voice codec control apparatus estimates an available bandwidth through information on the current call, that is, voice call quality (operation S34).

When the available bandwidth is sufficient to accept a new call, the voice codec control apparatus permits the call to be made and allocates a bandwidth suitable for the maximum transmission bit-rate of the terminal (operation S35).

When the available bandwidth is not sufficient to accept a new call, the voice codec control apparatus determines whether it is possible to adjust a bandwidth of each call in the network (operation S36). For this, the voice codec control apparatus determines whether it is possible to make a new call by extracting a predetermined bandwidth from existing calls in the network. When the bandwidths of the existing calls are limited and when voice data is transmitted with an existing bit-rate of the codec, the voice quality seriously deteriorates due to a data loss. Accordingly, it is necessary to change the transmission bit-rate of the codec so as to prevent the data loss.

When it is not possible to extract the predetermined bandwidth from each call so as to adjust the bandwidth, a request for making a call is denied (operation S37).

When it is possible to extract the predetermined bandwidth from each call so as to adjust the bandwidth, a codec bit-rate lower than the existing codec bit-rate of each call is selected (operation S38). In a process of providing a bandwidth needed for making a new call (operation S38), a minimum bandwidth is extracted from existing calls. In addition, a data loss and deterioration in the voice quality are minimized by minimizing the adjustment of the bit-rate.

When the codec bit-rate to be changed is selected, the voice codec control apparatus instructs respective terminals to which calls are connected to change a codec bit-rate through a separate packet (for example, RTCP) (operation S39). The packet has to be recognized by the terminal. In addition, the packet has to include information capable of limiting the bit-rate of the terminal codec in response to the instruction of the voice codec control apparatus.

The changed codec bit-rate limits the maximum transmission bit-rate of the terminal codec. Without an additional instruction (an instruction for permitting the maximum transmission bit-rate of the terminal), the terminal with the changed codec bit-rate continues to use the changed codec bit-rate. When the process of changing the codec bit-rate (operation S39) is completed, the voice codec control apparatus permits the call to be made (operation S35) and continues to monitor the network (operation S40).

Figure 4:
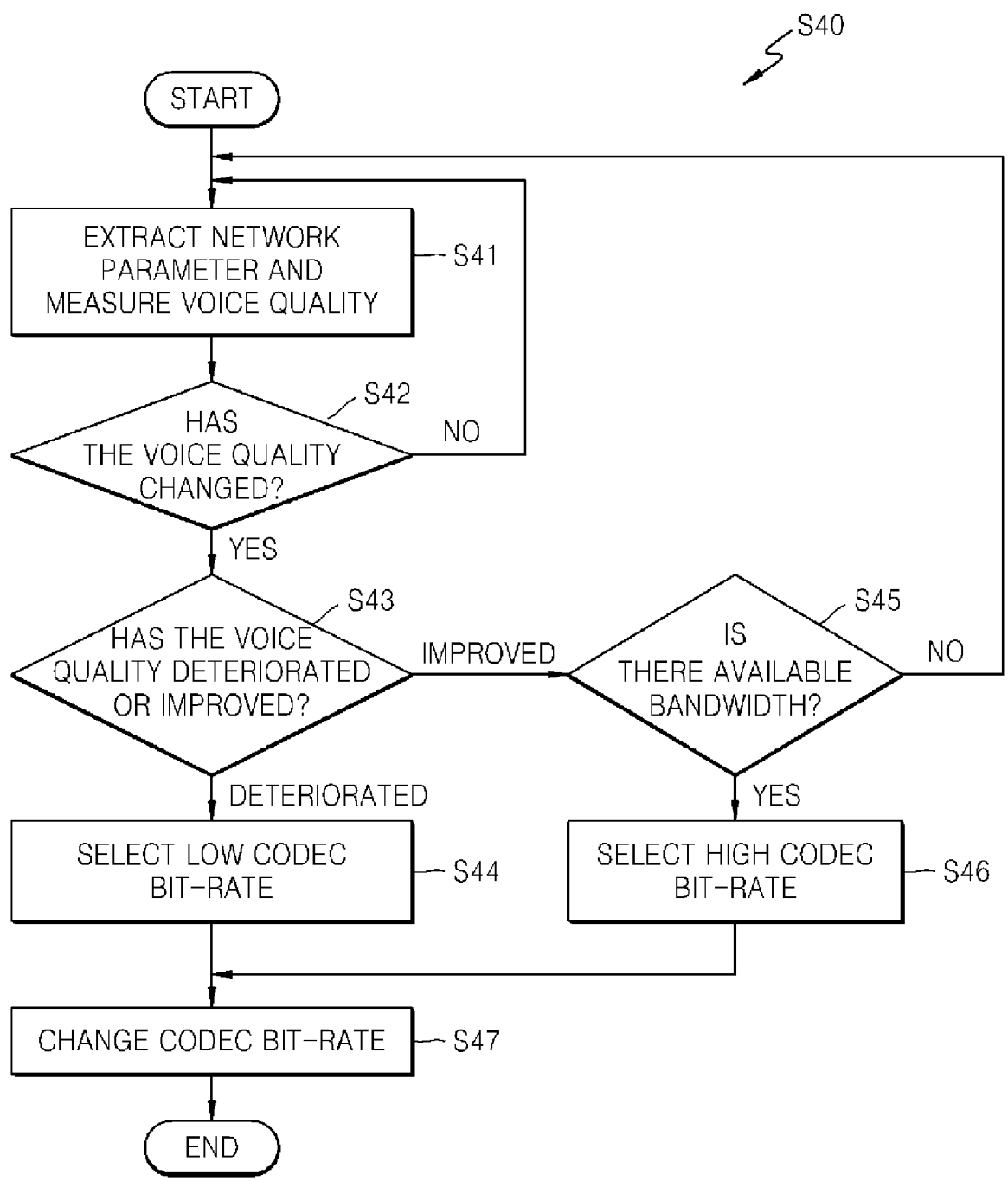
FIG. 4 is a flowchart illustrating a process of controlling a codec bit-rate of terminals through observation of a call between terminals with a variable bit-rate voice codec, according to an exemplary embodiment of the present invention.

FIG. 4 is a flowchart illustrating a process of controlling a codec bit-rate of terminals in a network through observation of a call between terminals with a variable bit-rate voice codec, according to an exemplary embodiment of the present invention.

Referring to FIG. 4, a voice codec control apparatus in the network continuously monitors each call in the network. A portion of the detailed description of the process of FIG. 4 similar to that of FIG. 3 will not be repeated.

A network parameter is extracted for each call, and voice quality is calculated using the parameter (operation S41).

It is determined whether voice quality is changed for each call by observing a change in the voice quality (operation S42). When there is no change in the voice quality, the bit-rate of the codec is not changed, and it is determined whether there is a request for making another new call.

When there is a change in the voice quality, it is determined whether the voice quality is deteriorated or improved (operation S43).

When the voice quality is deteriorated, a codec bit-rate lower than an existing codec bit-rate is selected so as to improve the voice quality for each call (operation S44).

When the voice quality is improved, it is checked whether there is an available bandwidth before increasing the codec bit-rate (operation S45).

When there is no spare bandwidth, the existing codec bit-rate is maintained. When there is a spare bandwidth, a codec bit-rate higher than the existing codec bit-rate is selected by increasing the codec bit-rate to a codec bit-rate not greater than the maximum transmission bit-rate of the terminal (operation S46).

After selecting the codec bit-rate, respective terminals to which calls are connected are instructed to change the codec bit-rate (operation S47). The changed codec bit-rate limits the maximum transmission bit-rate of the terminal codec. Without an additional instruction (for example, an instruction for permitting the maximum transmission bit-rate of the terminal), the terminal continues to use the changed codec bit-rate.

When the process of changing the codec bit-rate is completed, the voice codec control apparatus checks whether a request is made for making a new call. When no request for making a new call is made, the voice codec control apparatus is capable of providing optimal voice quality for each call by continuously monitoring the performance of the network. When a request is made for making a new call, the voice codec control apparatus returns to the process of extracting the terminal capability and determines whether to permit the call.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A variable bit-rate voice codec control apparatus for terminals connected to a network with a variable bit-rate voice codec, the variable bit rate voice codec control apparatus comprising:
   a terminal information extraction unit extracting calling capability of the terminals which request a new call to be made;
   a call quality monitor extracting network parameters from an existing call in the network through an exchanged packet and measuring voice quality of the existing call based on the extracted network parameters; and
   an admission policy unit determining whether to permit the new call to be made based on the measured voice quality and the extracted calling capability,
   wherein the admission policy unit further comprises a bandwidth estimation unit estimating an available bandwidth of the network based on the measured voice quality;

an admission unit permitting the new call to be made when the available bandwidth satisfies a condition needed for making the new call;

a bandwidth adjustment determining unit determining whether it is possible to provide a bandwidth needed for making the new call by adjusting the bandwidth of the existing call, when the available bandwidth does not satisfy the condition needed for making the new call; and a bit-rate selection unit selecting a changed codec bit-rate lower than the codec bit-rate of the existing call, when it is possible to provide the bandwidth needed for making the new call; and an admission controller allocating a bandwidth corresponding to the maximum transmission bit-rate of the terminals that request the new call to be made.

2. The variable bit-rate voice codec control apparatus of claim 1, wherein the terminal information extraction unit extracts a maximum transmission bit-rate of the variable bit-rate voice codec included in the terminals that request the new call to be made and calculates a bandwidth needed for making the new call based on the maximum transmission bit-rate.

3. The variable bit-rate voice codec control apparatus of claim 1, wherein the exchanged packet is a real-time transfer protocol (RTCP) packet, and the extracted network parameters comprise at least one of a packet loss, a delay, and jitter.

4. The variable bit-rate voice codec control apparatus of claim 1, wherein the admission controller changes the existing codec bit-rate into the changed codec bit-rate by transmitting the changed codec bit-rate to the respective terminals to which the existing call is connected.

5. The variable bit-rate voice codec control apparatus of claim 1, wherein the admission unit denies a request for making the new call when it is not possible to provide a bandwidth for making the new call.

6. The variable bit-rate voice codec control apparatus of claim 1, wherein the changed codec bit-rate corresponds to a bandwidth in which deterioration in call quality of the existing call is minimized.

7. The variable bit-rate voice codec control apparatus of claim 1, wherein the admission unit provides the changed codec bit-rate to the respective terminals to which the existing call is connected by using the RTCP packet.

8. A variable bit-rate voice codec control apparatus for controlling a codec bit-rate of terminals connected to a network with a variable bit-rate voice codec, the variable bit-rate voice codec control apparatus comprising:

a call quality monitor extracting network parameters from each of a plurality of existing calls between terminals in the network and measuring voice quality of each existing call based on the extracted network parameters; and a bit-rate selection unit determining whether to change the codec bit-rate of respective terminals to which calls are connected based on an increase and a decrease in the measured voice quality, wherein the bit-rate selection unit selects a changed codec bit-rate for each call so as to decrease a codec bit-rate of a call of which voice quality is deteriorated and to increase a codec bit-rate of a call of which voice quality is improved when there is an available bandwidth in the network, and the changed codec bit-rate higher than the existing codec bit-rate is selected to be not greater than a maximum transmission bit-rate of a terminal to which a corresponding call is connected.

9. A method performed in a control apparatus to control a variable bit-rate voice codec of terminals which are connected to a network, the method comprising:

(a) extracting calling capability of terminals that request a new call to be made, wherein (a) further comprises:

(a1) extracting a maximum transmission bit-rate of a variable bit-rate voice codec included in the terminals which request the new call to be made; and (a2) calculating bandwidth needed for making the new call based on the maximum transmission bit-rate;

(b) extracting network parameters from an existing call in the network through an exchanged packet;

(c) measuring voice quality of the existing call based on the extracted network parameters; and (d) determining in the control apparatus whether to permit the new call to be made based on the measured voice quality and the extracted calling capability, wherein (d) further comprises:

(d1) estimating an available bandwidth of the network based on the measured voice quality; and (d2) permitting the new call to be made when the available bandwidth satisfies a condition needed for making the new call.

10. The method of claim 9, wherein the exchanged packet is an RTCP (real-time transfer protocol) packet, and the extracted network parameters comprise at least one of a packet loss, a delay, and jitter.

11. The method of claim 9, wherein (d) further comprises:

(d3) determining whether it is possible to provide a bandwidth needed for making the new call by adjusting the bandwidth of the existing call, when the available bandwidth does not satisfy the condition needed for making the new call; and (d4) selecting a changed codec bit-rate lower than the codec bit-rate of the existing call, when it is possible to provide the bandwidth needed for making the new call.

12. The method of claim 11, wherein (d) further comprises (d6) denying a request for making the new call when it is not possible to provide a bandwidth needed for making the new call.

13. The method of claim 11, wherein (d) further comprises (d7) transmitting the changed codec bit-rate to the respective terminals to which the existing call is connected.

14. The method of claim 13, wherein in (d7), the changed codec bit-rate is provided to the respective terminals to which the existing call is connected by using an RTCP packet.

15. The method of claim 14, further comprising (e) determining whether the codec bit-rate of each call is changed by continuously measuring voice quality of each call in the network after permitting the new call to be made.

16. The method of claim 11, wherein the changed codec bit-rate corresponds to a bandwidth in which deterioration in the call quality of the existing call is minimized.

17. A method performed in a control apparatus to control a variable bit-rate voice codec of terminals which are connected to a network, the method comprising:

(a) extracting calling capability of terminals that request a new call to be made;

(b) extracting network parameters from an existing call in the network through an exchanged packet;

(c) measuring voice quality of the existing call based on the extracted network parameters; and
(d) determining in the control apparatus whether to permit the new call to be made based on the measured voice quality and the extracted calling capability, wherein (d) further comprises:
(d1) estimating an available bandwidth of the network based on the measured voice quality;
(d2) permitting the new call to be made when the available bandwidth satisfies a condition needed for making the new call;
(d3) determining whether it is possible to provide a bandwidth needed for making the new call by adjusting the bandwidth of the existing call, when the available bandwidth does not satisfy the condition needed for making the new call;
(d4) selecting a changed codec bit-rate lower than the codec bit-rate of the existing call, when it is possible to provide the bandwidth needed for making the new call; and
(d5) allocating a bandwidth corresponding to the maximum transmission bit-rate of the terminals that request the new call to be made.

18. The method of claim 17, wherein the exchanged packet is an RTCP (real-time transfer protocol) packet, and the extracted network parameters comprise at least one of a packet loss, a delay, and jitter.

19. The method of claim 17, wherein (d) further comprises
(d6) denying a request for making the new call when it is not possible to provide a bandwidth needed for making the new call.

20. The method of claim 17, wherein (d) further comprises
(d7) transmitting the changed codec bit-rate to the respective terminals to which the existing call is connected.

21. The method of claim 20, wherein in (d7), the changed codec bit-rate is provided to the respective terminals to which the existing call is connected by using an RTCP packet.

22. The method of claim 21, further comprising
(e) determining whether the codec bit-rate of each call is changed by continuously measuring voice quality of each call in the network after permitting the new call to be made.

23. The method of claim 17, wherein the changed codec bit-rate corresponds to a bandwidth in which deterioration in the call quality of the existing call is minimized.

24. A method performed in a control apparatus to control a variable bit-rate voice codec of terminals connected a network, the method comprising:
(a) extracting network parameters from each of a plurality of existing calls between terminals in the network;
(b) measuring voice quality of each existing call based on the extracted network parameters; and
(c) determining in the control apparatus whether to change the codec bit-rate of the respective terminals to which the calls are connected based on an increase and a decrease in the measured voice quality, wherein (c) comprises:
(c1) selecting a codec bit-rate lower than an existing codec bit-rate with respect to a call of which voice quality is deteriorated; and
(c2) selecting a codec bit-rate higher than the existing codec bit-rate with respect to a call of which voice quality is improved when there is an available bandwidth in the network, wherein (c2) comprises selecting a codec bit-rate higher than the existing codec bit-rate and not greater than the maximum transmission bit-rate of a terminal to which a corresponding call is connected.

* * * * *